(12) United States Patent
Sobel et al.

(10) Patent No.: US 9,860,230 B1
(45) Date of Patent: Jan. 2, 2018

(54) SYSTEMS AND METHODS FOR DIGITALLY SIGNING EXECUTABLES WITH REPUTATION INFORMATION

(75) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1533 days.

(21) Appl. No.: 12/858,085

(22) Filed: Aug. 17, 2010

(51) Int. Cl.
G06E 1/00 (2006.01)
H04L 29/06 (2006.01)
G06F 21/33 (2013.01)

(52) U.S. Cl.
CPC .......... *H04L 63/0807* (2013.01); *G06F 21/33* (2013.01); *H04L 63/0823* (2013.01)

(58) Field of Classification Search
CPC ............. H04L 63/0807; H04L 63/0823; H04L 49/3294; G06F 21/33
USPC .......................................................... 726/10
See application file for complete search history.

(56) References Cited

U.S. PATENT DOCUMENTS

| | | | | |
|---|---|---|---|---|
| 5,892,904 A * | 4/1999 | Atkinson | ................ | G06F 21/33 713/170 |
| 6,367,012 B1 * | 4/2002 | Atkinson et al. | ............. | 713/176 |
| 7,269,851 B2 | 9/2007 | Ackroyd | | |
| 7,831,412 B1 | 11/2010 | Sobel | | |
| 2005/0138223 A1 * | 6/2005 | Clifton | ................ | G06F 3/0619 710/1 |
| 2005/0283831 A1 | 12/2005 | Ryu et al. | | |
| 2006/0253458 A1 * | 11/2006 | Dixon et al. | ................ | 707/10 |
| 2006/0253584 A1 * | 11/2006 | Dixon et al. | ................ | 709/225 |
| 2007/0074033 A1 * | 3/2007 | Adams et al. | ................ | 713/176 |
| 2008/0028100 A1 * | 1/2008 | Adelman | ................ | G06F 15/16 709/245 |
| 2008/0028443 A1 * | 1/2008 | Adelman et al. | ................ | 726/4 |
| 2008/0256619 A1 * | 10/2008 | Neystadt et al. | ................ | 726/11 |
| 2008/0256622 A1 * | 10/2008 | Neystadt et al. | ................ | 726/14 |
| 2009/0007102 A1 * | 1/2009 | Dadhia | ................ | G06F 21/566 718/1 |
| 2009/0083731 A1 * | 3/2009 | Sobel | ................ | 717/177 |

(Continued)

OTHER PUBLICATIONS

Phani Vadrevu et al., "Measuring and Detecting Malware Downloads in Live Network Traffic," ESORICS 2013, LNCS 8134, pp. 556-573.*

(Continued)

*Primary Examiner* — Luu Pham
*Assistant Examiner* — Canh Le
(74) *Attorney, Agent, or Firm* — FisherBroyles LLP

(57) ABSTRACT

A computer-implemented method for digitally signing executables with reputation information is disclosed. This method may include (1) receiving a request for a reputation certificate for an executable file, (2) identifying reputation information associated with the executable file, (3) generating a digitally signed reputation certificate for the executable file that includes at least the reputation information associated with the executable file, and then (4) providing the reputation certificate in response to the request. Additional computer-implemented methods for evaluating the trustworthiness of executable files based at least in part on reputation information contained within such digitally signed reputation certificates, along with corresponding systems and computer-readable media, are also disclosed.

20 Claims, 9 Drawing Sheets

(56) References Cited

U.S. PATENT DOCUMENTS

2009/0187442 A1\* 7/2009 Kohanim et al. .............. 705/7
2009/0187988 A1 7/2009 Hulten et al.

OTHER PUBLICATIONS

Manuel Rodriguez-Perez, "Analysis of Peer-to-peer Distributed Reputation Schemes," 2005 IEEE, pp. 1-6.\*
Sourabh Satish et al.; Social Trust Based Security Model; Mar. 31, 2006; U.S. Appl. No. 11/394,846.
Satish, Sourabh; U.S. Appl. No. 12/049,751, filed Mar. 17, 2008.
Satish, Sourabh; U.S. Appl. No. 12/056,379, filed Mar. 27, 2008.
Nachenberg, Carey S.; U.S. Appl. No. 12/415,834, filed Mar. 31, 2009.
Ashwin P.R.; Systems and Methods for Reporting Online Behavior; U.S. Appl. No. 13/045,056, filed Mar. 10, 2011.
Dave Greenfield; Using Reputation to Change Web Surfing Habits; Team Think; Jun. 18, 2010.

\* cited by examiner

SYSTEMS AND METHODS FOR DIGITALLY SIGNING EXECUTABLES WITH REPUTATION INFORMATION

BACKGROUND

In recent years, authors of malicious software ("malware") have attempted to proliferate malware by generating thousands or potentially millions of variations of a malicious file. For example, a malware author may create a unique version of a malicious file for each intended target by repacking (i.e., compressing, encrypting, and/or otherwise obfuscating) the file on a server before distributing the same. Unfortunately, because many existing antivirus technologies detect malware by detecting or identifying unique digital signatures or fingerprints associated with known-malicious files, malware authors may avoid detection by only distributing new (i.e., unique), repacked versions of malicious files.

In light of this, at least one security-software vendor has begun investigating and implementing reputation-based security systems. In a reputation-based security system, a security-software vendor may attempt to determine the trustworthiness and/or legitimacy of a file by collecting, aggregating, and analyzing data from potentially millions of user devices within a community, such as the security-software vendor's user base. For example, by determining a file's origin, age, and prevalence within the community (such as whether the file is predominantly found on at-risk or "unhealthy" machines within the community), among other details, a security-software vendor may gain a fairly accurate understanding as to the trustworthiness of the file.

Current reputation-based security systems typically rely on the ability to connect to remote servers (e.g., central authorities, distributed systems, and/or upstream caches) in order to obtain reputation information for each encountered file. This characteristic, however, may prevent reputation-based security systems from being utilized in scenarios where network access is restricted (e.g., "dark" networks), prohibited (e.g., during air travel), and/or unavailable (due, e.g., to network limitations and/or failures). As such, the instant disclosure identifies a need for systems and methods for utilizing reputation information in disconnected environments.

SUMMARY

As will be described in greater detail below, the instant disclosure generally relates to systems and methods for utilizing reputation information in disconnected environments by digitally signing executables with reputation information. In some examples, the systems described herein may accomplish such a task by (1) receiving a request for a reputation certificate for an executable file (from, e.g., a publisher of the file or an administrator or end user that has encountered the file), (2) obtaining or determining the reputation of the executable file, its publisher, and/or a download link associated with the file, (3) generating a digitally signed reputation certificate for the executable file that includes at least a portion of this reputation information, and then (4) providing the digitally signed reputation certificate (which includes the reputation information) in response to the request.

The request may include information (such as a hash of the file and/or a copy of the file) that uniquely identifies the executable file in question. In some examples, the systems described herein may add the digitally signed reputation certificate directly to the executable file. In other examples, these systems may add the digitally signed reputation certificate to a separate manifest file that is associated with the executable file.

If the creator of the reputation certificate is acting as a root certificate authority, then the reputation certificate may also include information that identifies the publisher of the executable file and/or include the publisher's public key (used, e.g., to decrypt and verify the publisher's digital signature). The systems described herein may also countersign an existing signing certificate with the identified reputation information, thereby effectively creating a reputation certificate for the executable file in question.

The instant disclosure also describes and illustrates various systems and methods for evaluating the trustworthiness of executable files based at least in part on reputation information contained within digitally signed reputation certificates created in the manner detailed above. In one example, the systems described herein may accomplish such a task by (1) identifying an executable file (by, e.g., detecting an attempt to download or access the executable file), (2) identifying a digitally signed reputation certificate associated with the executable file (stored, e.g., either within the file itself or within a separate manifest file), (3) identifying, within the reputation certificate, reputation information associated with the executable file, and then (4) evaluating the trustworthiness of the executable file based at least in part on the reputation information contained within the reputation certificate.

In some examples, the systems described herein may verify that the reputation information applies to the executable file in question prior to relying on the same by, for example, verifying that a hash of the executable code of the executable file matches a file hash identified within the reputation information.

In one embodiment, a policy component may control whether the systems described herein may rely upon the reputation information contained within the reputation certificate. For example, upon identifying the reputation certificate, the systems described herein may (1) identify at least one policy that includes criteria for determining whether the reputation certificate is valid (i.e., whether the reputation certificate has expired and/or whether the reputation certificate may supersede a reputation-database check) and then (2) determine, by applying the criteria, whether the reputation certificate is valid.

As will be explained in greater detail below, by including digitally signed reputation information within executable files or manifest files associated with the same, the systems and methods described herein may enable security software to access and rely upon reputation information in scenarios where network access is restricted, prohibited, and/or unavailable. In addition, because executable files within reputation systems are commonly uniquely identified by file hash, the systems and methods described herein may enable administrators and/or end users to request and obtain digitally signed reputation information for executable files at any point in time without compromising the security of the system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
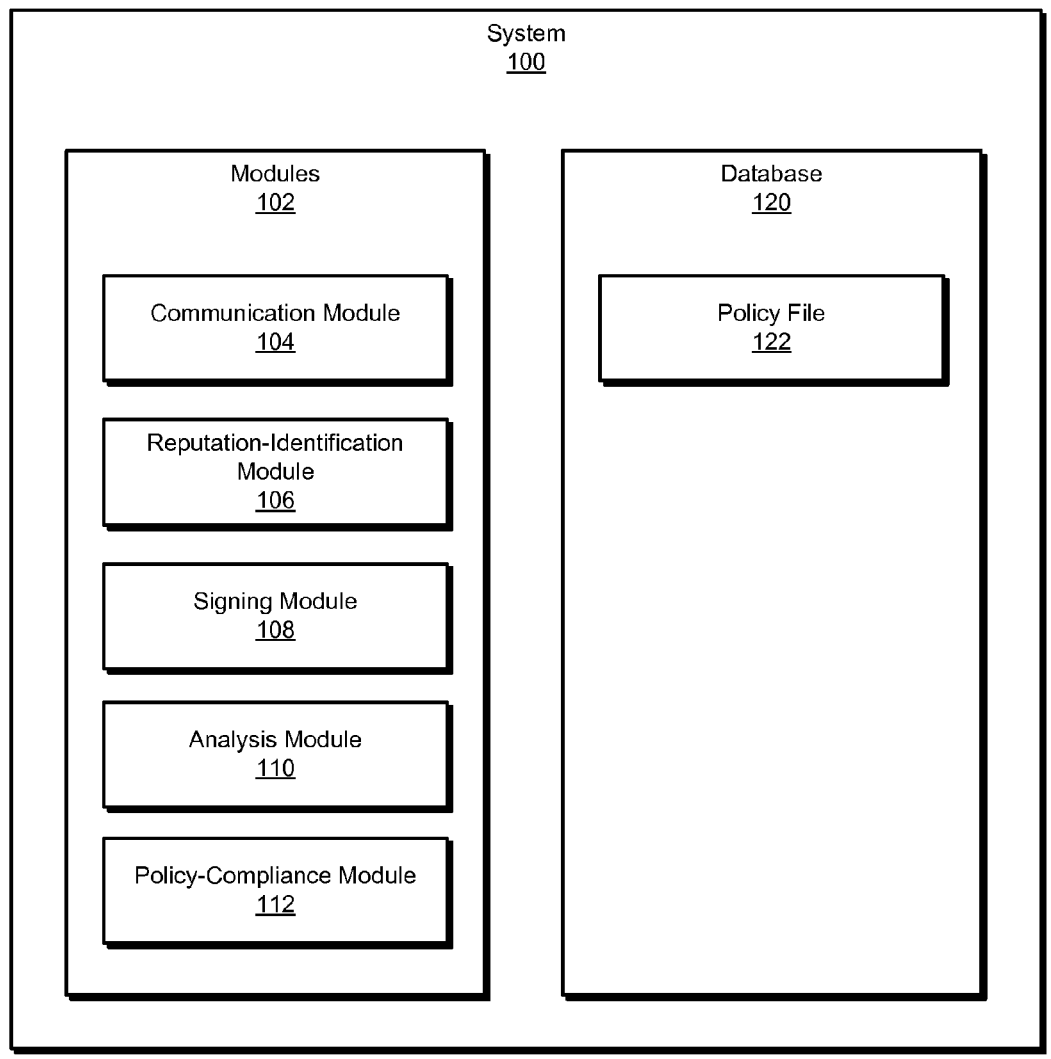
FIG. 1 is a block diagram of an exemplary system for digitally signing executables with reputation information.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
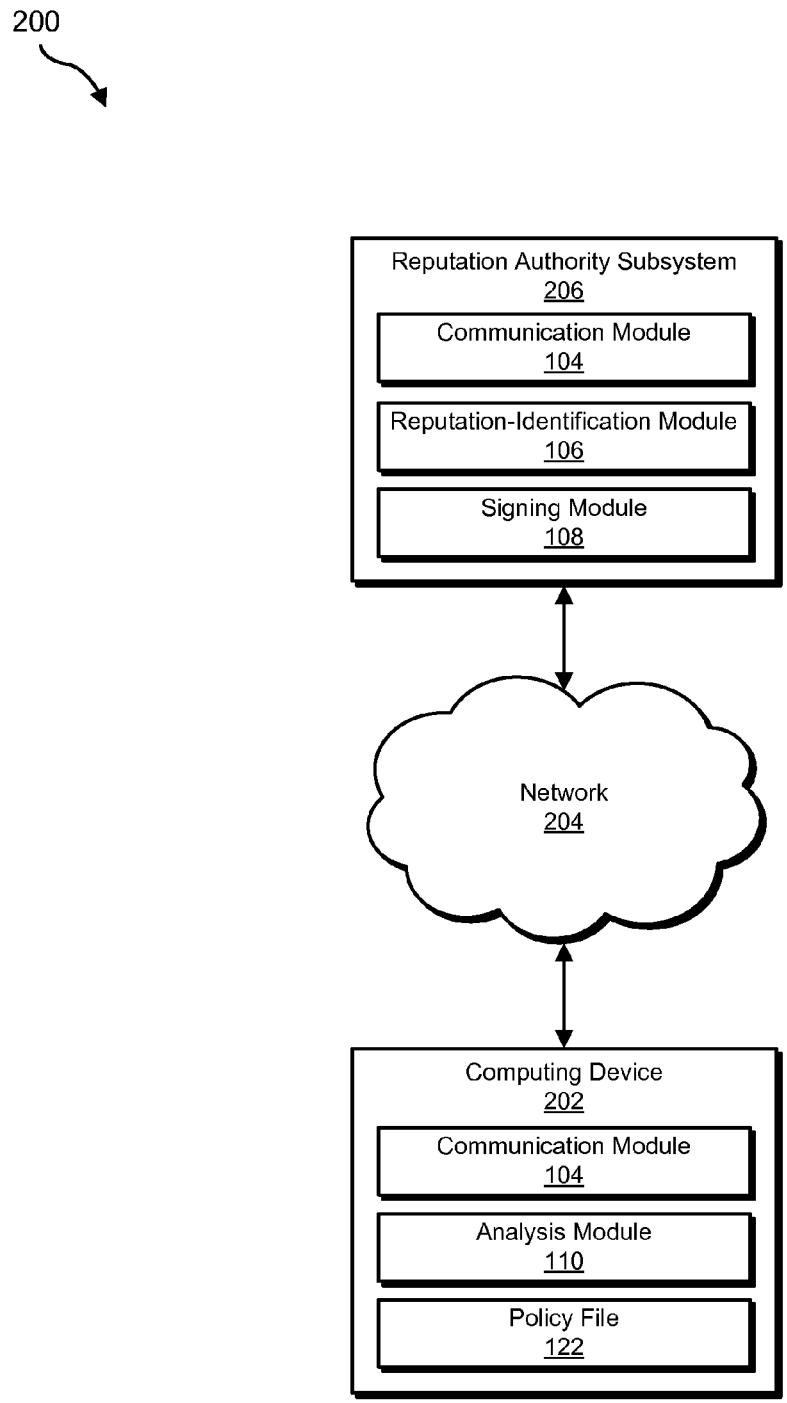
FIG. 2 is a block diagram of an exemplary system for digitally signing executables with reputation information.

The following will provide, with reference to FIGS. 1-2, detailed descriptions of exemplary systems for digitally signing executables with reputation information. Detailed descriptions of corresponding computer-implemented methods will also be provided in connection with FIGS. 3-9. In addition, detailed descriptions of an exemplary computing system and network architecture capable of implementing one or more of the embodiments described herein will be provided in connection with FIGS. 10 and 11, respectively.

FIG. 1 is a block diagram of an exemplary system 100 for digitally signing executables with reputation information. As illustrated in this figure, exemplary system 100 may include one or more modules 102 for performing one or more tasks. For example, and as will be explained in greater detail below, exemplary system 100 may include a communication module 104 programmed to receive a request for a reputation certificate for an executable file. Exemplary system 100 may also include a reputation-identification module 106 programmed to identify reputation information associated with the executable file and a signing module 108 programmed to generate a digitally signed reputation certificate for the executable file that includes the identified reputation information.

In addition, and as will be described in greater detail below, exemplary system 100 may include an analysis module 108 programmed to evaluate the trustworthiness of an executable file based at least in part on reputation information contained within a digitally signed reputation certificate associated with the executable file. Exemplary system may also include a policy-compliance module 112 programmed to (1) identify at least one policy that comprises criteria for determining whether the reputation certificate is valid (i.e., whether the reputation certificate has expired and/or whether the reputation certificate may supersede a reputation-database check) and then (2) determine, by applying the criteria within the policy, whether the reputation certificate is valid. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or reputation authority subsystem 206), computing system 1010 in FIG. 10, and/or portions of exemplary network architecture 1100 in FIG. 11. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include a policy file that contains criteria for determining whether to rely upon a particular reputation certificate. Database 120 may represent portions of a single database or computing device or a plurality of databases or computing devices. For example, database 120 may represent a portion of reputation authority subsystem 206 in FIG. 2, computing system 1010 in FIG. 10, and/or portions of exemplary network architecture 1100 in FIG. 11. Alternatively, database 120 in FIG. 1 may represent one or more physically separate devices capable of being accessed by a computing device, such as reputation authority subsystem 206 in FIG. 2, computing system 1010 in FIG. 10, and/or portions of exemplary network architecture 1100 in FIG. 11.

Exemplary system 100 in FIG. 1 may be deployed in a variety of ways. For example, all or a portion of exemplary system 100 may represent portions of exemplary system 200 in FIG. 2. As shown in FIG. 2, system 200 may include a computing device 202 in communication with a reputation authority subsystem 206 via a network 204. In one embodiment, and as will be described in greater detail below, one or more of modules 102 may program reputation authority subsystem 206 to digitally sign executables with reputation information by (1) receiving (from, e.g., computing device 202) a request for a reputation certificate for an executable file, (2) obtaining or calculating reputation information (e.g., reputation information 422 in FIG. 8) for the executable file in question, (3) generating a digitally signed reputation certificate (e.g., reputation certificate 420 in FIG. 4 or 5) for the executable file that includes at least the identified reputation information, and then (4) providing the reputation certificate to computing device 202.

Similarly, in some examples one or more of modules 102 may program computing device 202 to evaluate the trustworthiness of executable files based at least in part on reputation information contained within digitally signed reputation certificates by (1) identifying an executable file (such as executable 402 in FIG. 4 or 5), (2) identifying a digitally signed reputation certificate (e.g., reputation certificate 420 in FIG. 4 or 5) associated with the executable file, (3) identifying, within the reputation certificate, reputation information associated with the executable file (e.g., reputation information 422 in FIG. 8), and then (4) evaluating the trustworthiness of the executable file based at least in part on the reputation information contained within the reputation certificate.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 1010 in FIG. 10, or any other suitable computing device. Exemplary operators of computing device 202 include, without limitation, software publishers, administrators, end users, and the like.

Reputation authority subsystem 206 generally represents any type or form of computing device that is capable of providing digitally signed reputation information. Examples of reputation authority subsystem 206 include, without limitation, application servers and database servers configured to provide various database services and/or run certain software applications. In some examples, reputation authority subsystem 206 may be managed by a reputation authority.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 1100 in FIG. 11, or the like. Network 204 may facilitate communication or data transfer using wireless or wired connections. In one embodiment, network 204 may facilitate communication between computing device 202 and reputation authority subsystem 206.

Figure 3:
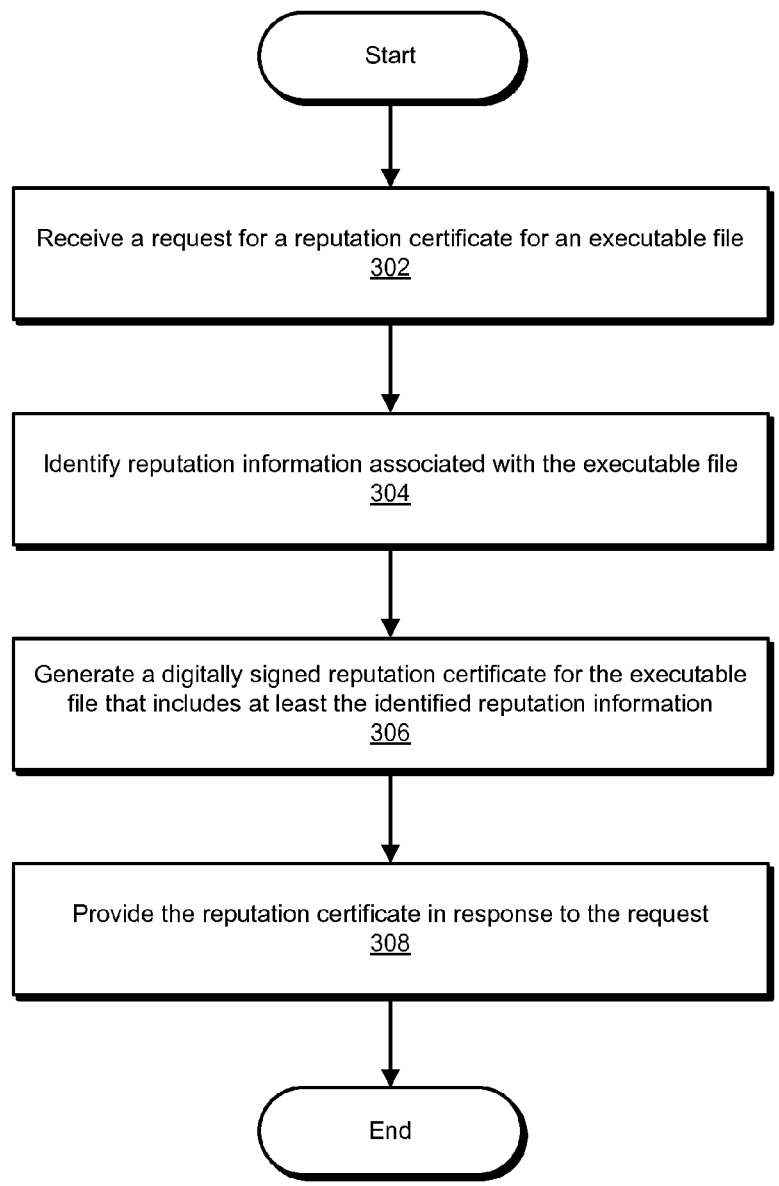
FIG. 3 is a flow diagram of an exemplary method for digitally signing executables with reputation information.

FIG. 3 is a flow diagram of an exemplary computer-implemented method 300 for digitally signing executables with reputation information. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1010 in FIG. 10, and/or portions of exemplary network architecture 1100 in FIG. 11.

As illustrated in FIG. 3, at step 302 one or more of the systems described herein may receive a request for a reputation certificate for an executable file. For example, communication module 104 may, as part of reputation authority subsystem 206 in FIG. 2, receive a request for a reputation certificate for an executable file from computing device 202.

The request received in step 302 may originate from a variety of sources. In some examples, the request received in step 302 may represent a request from a software publisher to digitally sign an executable file. In this example, the software publisher may include a copy of the executable file to be digitally signed within the request.

In another example, the request received in step 302 may represent a request from an administrator or end user for reputation information for an executable file encountered in the field. For example, an administrator or end user (or security software on a computing device operated by the same) may, upon encountering an executable file in the field, request reputation information for the same from reputation authority subsystem 206. In this example, the administrator's or end user's request may uniquely identify the executable file in question by including a file hash or other unique identifier for the file.

At step 304, the systems described herein may identify reputation information associated with the executable file identified in the request received at step 302. For example, reputation-identification module 106 may, as part of reputation authority subsystem 206 in FIG. 2, obtain or calculate reputation information for the executable file identified in the request received from computing device 202 in FIG. 2.

The term "reputation information," as used herein, generally refers to information that conveys the opinion of a specific community (such as the user base of a security-software publisher) on the trustworthiness or legitimacy of an executable file, software publisher, and/or file source (such as a web domain or download link). Examples of reputation information include, without limitation, reputation scores (where, for example, high reputation scores indicate that a file, software publisher, or file source is generally trusted within a community and low reputation scores indicate that a file, software publisher, or file source is generally untrusted within a community), prevalence information (e.g., information that identifies the number or percentage of user devices within a community that contain (1) an instance of a particular file, (2) files provided by a particular software publisher, and/or (3) files obtained from a particular file source, such as a web domain), or any other information that may be used to identify a community's opinion on the trustworthiness or legitimacy of a file, software publisher, and/or file source.

Figure 4:
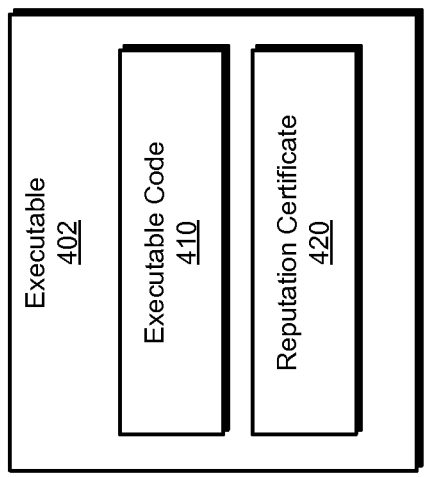
FIG. 4 is a block diagram of an exemplary executable file containing digitally signed reputation information.
Figure 7:
FIG. 7 is a block diagram of an exemplary signing certificate containing digitally signed reputation information.
Figure 8:
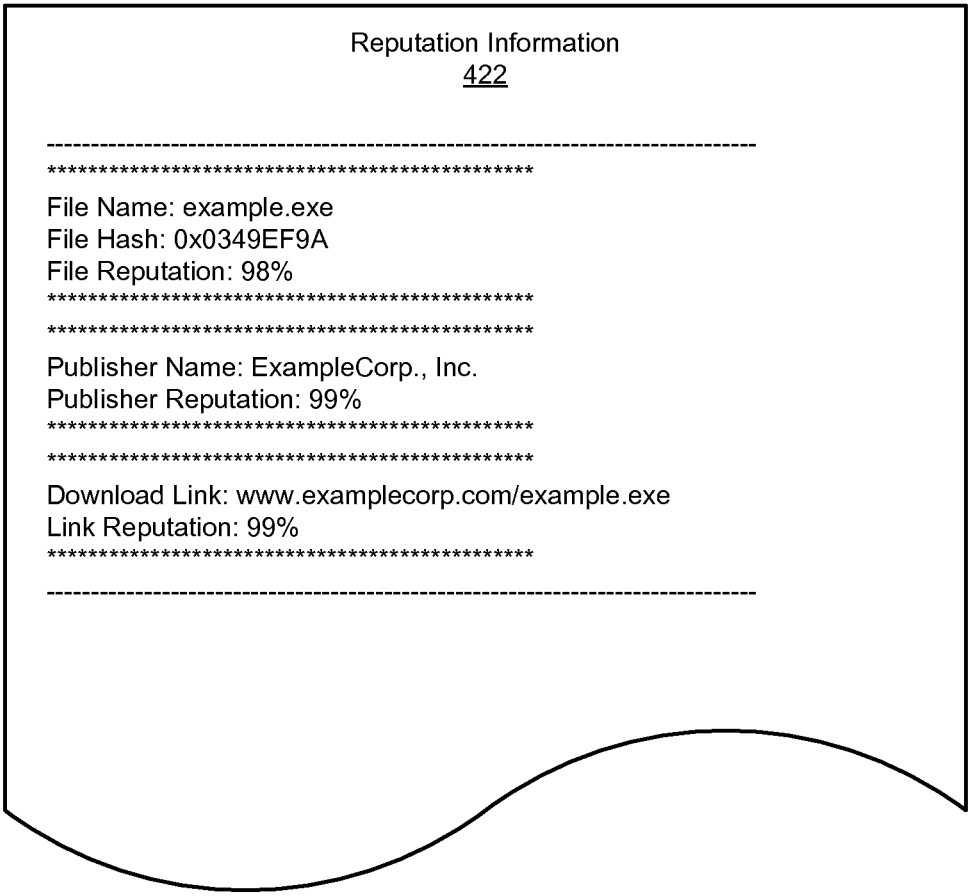
FIG. 8 is an illustration of exemplary reputation information that may be included within a digitally signed reputation certificate.

FIG. 8 is an example of reputation information that may be obtained for a particular executable file, such as executable 402 in FIG. 4. As illustrated in this figure, reputation information 422 may include information that uniquely identifies the file in question (by, e.g., filename and/or file hash), a publisher of the file (by, e.g., common and/or distinguished name), and a download link associated with the file (by, e.g., URL). Reputation information 422 may also contain reputation scores for the file in question ("98%", in this example), for the file's publisher ("99%", in this example), and for the download link associated with the file ("99%", in this example). In this example, these high reputation scores may indicate that the file, its publisher, and its associated download link are all generally regarded as trustworthy and/or legitimate.

The systems described herein may obtain and/or calculate reputation information in a variety of ways. In one example, reputation-identification module 106 may obtain reputation information for an executable file, software publisher, and/or file source from a reputation service. This reputation service may generate reputation information for files, software publishers, and/or file sources by collecting, aggregating, and analyzing data from user devices within a community (such as the user base of a security-software publisher). Examples of data gathered from user devices within a community that may be used to generate reputation information include, without limitation, information that identifies the overall health of a user device (i.e., information that identifies the performance, stability, and/or state of security of the user device), information that identifies the files stored on a user device (including information that identifies the publisher and/or source of origin of such files), information that identifies the impact of a file on the health of a user device (e.g., information that identifies the health of the user device both before and after the file is stored on the user device), and any other information that may be used to evaluate the trustworthiness of a file, software publisher, and/or file source. In some examples, by collecting, aggregating, and analyzing this data from potentially millions of user devices within a community (such as the user base of a security-software publisher), reputation services may be able to gain a fairly accurate understanding as to the trustworthiness of a file, software publisher, and/or file source.

Returning to FIG. 3, at step 306 the systems described herein may generate a digitally signed reputation certificate for the executable file identified in the request received in step 302. For example, signing module 108 may, as part of reputation authority subsystem 206 in FIG. 2, generate a digitally signed reputation certificate for the executable file identified in the request received from computing device 202 in step 302.

In some examples, the reputation certificate generated in step 306 may include (1) a copy of the reputation information identified in step 304, (2) information that uniquely identifies the signing authority responsible for generating the reputation certificate (referred to hereafter as the "reputation authority"), and (3) the reputation authority's digital signature. For example, reputation certificate 420 in FIG. 6 may include (1) reputation information 422 (which may include, as illustrated in FIG. 8, the reputation of the file in question, its publisher, and/or a download link associated with the file), identification information 424 (which may include the distinguished name of the reputation authority that created reputation certificate 420), and digital signature 426. In one example, the reputation authority may digitally sign reputation certificate 420 by hashing both reputation information 422 and identification information 424 and then encrypting the same using a private encryption key, resulting in digital signature 426.

In some examples, the systems described herein may add the reputation certificate created in step 306 directly to the executable file in question. For example, and as illustrated in FIG. 4, signing module 108 may add reputation certificate 420 directly to an executable 402 received from a software publisher.

Figure 5:
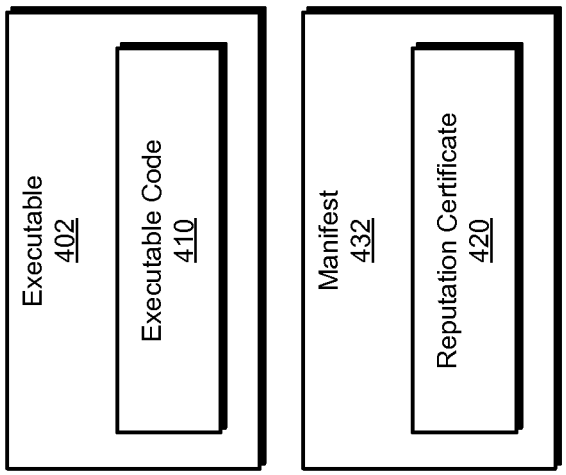
FIG. 5 is a block diagram of an exemplary manifest file containing digitally signed reputation information for an executable file.

In other examples, the systems described herein may add the reputation certificate to a separate file (such as a manifest file) associated with the executable file. For example, and as illustrated in FIG. 5, signing module 108 may add reputation certificate 420 to a separate manifest file 432 associated with executable 402. As will be explained in greater detail below, by including a file hash or other unique file identifier for the executable file in question within the reputation certificate (as illustrated in FIG. 8), the systems described herein may enable reputation authorities to provide reputation certificates independent of the executable files in question (such as within separate manifests) without compromising the security of the system.

In some examples, the reputation authority responsible for generating reputation certificate 420 may act as a root certificate authority. In this example, the reputation certificate created in step 306 may also include information that identifies a publisher of the executable file in question (using, e.g., the distinguished name of the publisher) and/or a public key provided by the publisher of the executable file in question (used, e.g., to decrypt and verify the publisher's digital signature). Signing module 108 may then digitally sign all information contained within the reputation certificate (i.e., the reputation information, the reputation authority's identification information, the publisher's identification information, and the publisher's public key) by hashing and then encrypting the same using the reputation authority's private key.

If a reputation authority chooses to act as a root certificate authority, the reputation authority may authenticate each publisher prior to issuing a reputation certificate to the same by, for example, (1) requesting, either from the publisher or from an additional source, additional information regarding the identity of the publisher (i.e., information that may be used to authenticate the publisher, such as information that may be used identify the size of the publisher, how long the publisher has been in operation, annual revenues of the publisher, the number of applications or files of the publisher that are in circulation, whether the publisher has been known to generate malware, or the like), (2) requesting information regarding executable files published by the publisher (e.g., information that may be used to determine the nature and purpose of files published by the publisher in order to determine why such files require the requested set of privileges), and/or (3) requesting a certification fee from the publisher.

In some examples, the systems described herein may perform step 306 by countersigning an existing signing certificate with reputation information, thereby effectively creating a reputation certificate. For example, signing module 108 may countersign an existing signing certificate 720 in FIG. 7 (obtained, e.g., from a software publisher via a certificate authority) with reputation information by adding digitally signed reputation certificate 420 to signing certificate 720. As detailed above, reputation certificate 420 may include reputation information 422, the reputation authority's identification information 424, and the reputation authority's digital signature 426.

Returning to FIG. 3, at step 308 the systems described herein may provide the reputation certificate generated in step 306 to the requester. For example, communication module 104 may, as part of reputation authority subsystem 206 in FIG. 2, transmit reputation certificate 420 to computing device 202.

As detailed above, the systems described herein may add the reputation certificate generated in step 306 either directly to the executable file in question or to a separate manifest file associated with the executable file. As such, the systems described herein may perform step 308 either by providing an executable file that includes the reputation certificate or by providing a separate manifest file that includes the reputation certificate.

For example, reputation authority subsystem 206 may perform step 308 by providing executable 402 in FIG. 4, which includes reputation certificate 420, to a software publisher. Similarly, reputation authority subsystem 206 may perform step 308 by providing manifest file 420 in FIG. 5, which includes reputation certificate 420, to an administrator or end user that has encountered the file in question. Upon completion of step 308, the logical flow of exemplary method 308 in FIG. 3 may terminate.

Figure 9:
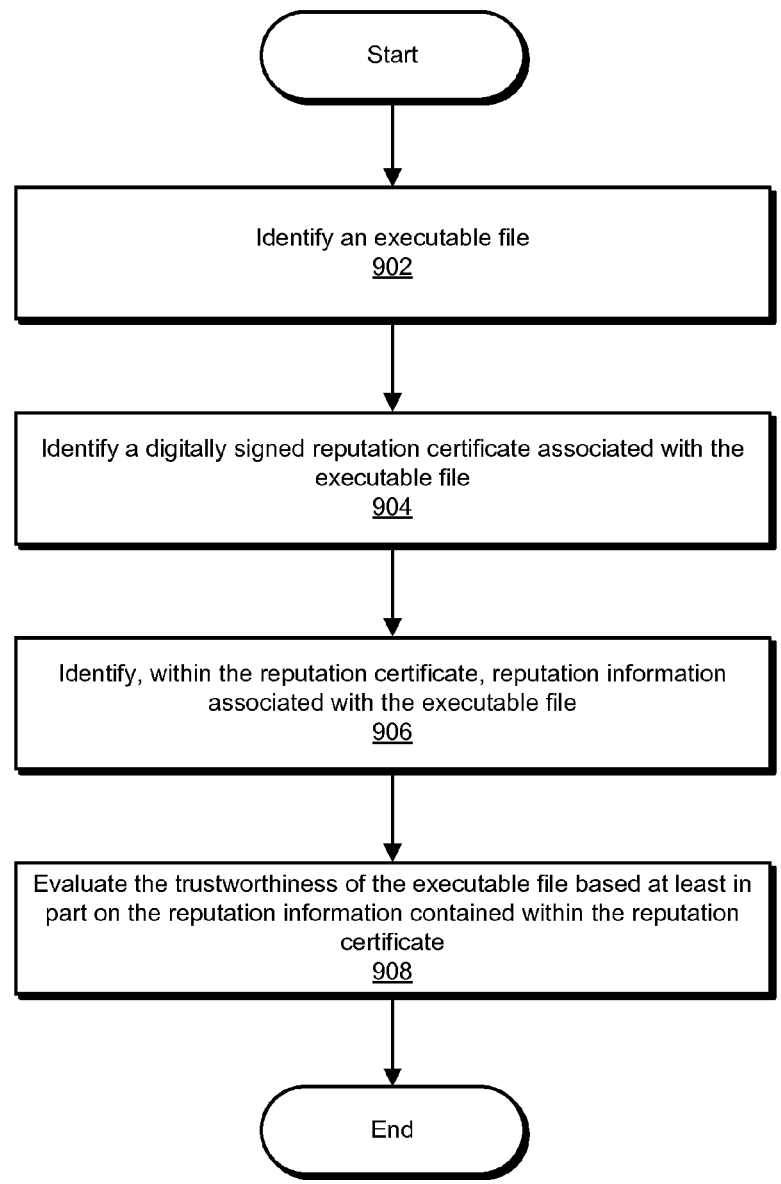
FIG. 9 is a flow diagram of an exemplary method for evaluating the trustworthiness of executable files based at least in part on reputation information contained within digitally signed reputation certificates.

FIG. 9 is a flow diagram of an exemplary computer-implemented method 900 for evaluating the trustworthiness of executable files based at least in part on reputation information contained within digitally signed reputation certificates, such as those discussed above in connection with FIG. 3. The steps shown in FIG. 9 may be performed by any suitable computer-executable code and/or computing system. In some embodiments, the steps shown in FIG. 9 may be performed by one or more of the components of system 100 in FIG. 1, system 200 in FIG. 2, computing system 1010 in FIG. 10, and/or portions of exemplary network architecture 1100 in FIG. 11.

As illustrated in FIG. 9, at step 902 one or more of the various systems described herein may identify an executable file. For example, analysis module 110 may, as part of computing device 202 in FIG. 2, identify executable 402 in FIG. 4 or 5.

The systems described herein may perform step 902 in a variety of ways. In one example, analysis module 110 may identify an executable file when the file is loaded or executed on computing device 202. In other examples, analysis module 110 may identify an executable file when the system detects an attempt to load or execute the file on computing device 202. Analysis module 110 may also identify an executable file when the file is downloaded or otherwise loaded onto computing device 202.

At step 904, the systems described herein may identify a digitally signed reputation certificate associated with the executable file identified in step 902. For example, analysis module 110 may, as part of computing device 202 in FIG. 2, identify reputation certificate 420 within executable 402 in FIG. 4.

The systems described herein may perform step 904 in a variety of ways. In one example, the systems described herein may obtain the reputation certificate directly from the executable file in question. For example, analysis module 110 may obtain reputation certificate 420 directly from executable 402 in FIG. 4.

In another example, the systems described herein may obtain the reputation certificate from a separate manifest file associated with the executable file in question. For example, analysis module 110 may obtain reputation certificate 420 from manifest 432 in FIG. 5. As detailed above, because reputation systems typically uniquely identify files using file hashes or other similar techniques, an administrator or end user (or security software on a computing device operated by the same) may request and obtain a separate manifest file (such as manifest 432 in FIG. 5) containing reputation information for an executable file at any time independent of the publisher of the file in question without comprising the security of the system.

In some examples, the systems described herein may validate the reputation certificate prior to relying on the same. For example, analysis module 110 may, as part of computing device 202 in FIG. 2, identify and validate digital signature 426 within reputation certificate in FIG. 5 in order to verify that reputation certificate 420 has not been modified or tampered with since it was created by the reputation authority. As detailed above, digital signature 426 generally represents any type or form of electronic document that may be used to verify the authenticity of a file. In one example, digital signature 426 may be generated by a reputation authority by generating a hash of the contents of reputation certificate 420 (e.g., reputation information 422 and identification information 424) and then electronically signing (i.e., encrypting) this hash using the reputation authority's private key.

Figure 6:
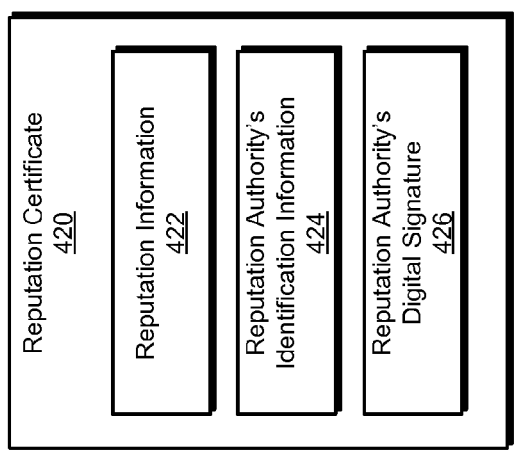
FIG. 6 is a block diagram of an exemplary reputation certificate containing digitally signed reputation information.

In this example, analysis module 110 may validate digital signature 426 in FIG. 6 by (1) calculating a hash of the contents of reputation certificate 420, (2) decrypting, using a public key provided by the reputation authority in question, digital signature 426 to obtain an expected hash, and then (3) determining that the calculated hash matches the expected hash. Validating the digital signature in this manner may verify that reputation certificate 420 has not been modified or tampered with since it was created by the reputation authority.

In some examples, a policy component may control whether the systems described herein may rely upon the reputation information contained within the reputation certificate identified in step 904. For example, upon identifying the reputation certificate in step 904, the systems described herein may (1) identify at least one policy that includes criteria for determining whether the reputation certificate is valid (i.e., whether the reputation certificate has expired and/or whether the reputation certificate may supersede a reputation-database check) and then (2) determine, by applying the criteria, whether the reputation certificate is valid.

For example, after analysis module 110 has identified reputation certificate 420 in step 904, policy-compliance module 112 may, as part of computing device 202 in FIG. 2, access a policy file 122 in FIG. 1 that contains criteria for determining whether analysis module 110 may rely upon the reputation information contained within reputation certificate 420. Examples of the types of criteria that policy file 122 may contain include, without limitation, criteria for determining whether a reputation certificate was created within a specific period of time (such as within the last 30 days), criteria for determining whether an online connection is available (and thus whether a reputation-database check is available), or any other criteria that may be useful in determining whether a reputation certificate has expired and/or may supersede a reputation-database check.

Upon identifying policy file 122, policy-compliance module 112 may determine, by applying the criteria within policy file 122 to reputation certificate 420, whether reputation certificate 420 is valid. If so, then policy-compliance module 112 may instruct analysis module 110 to access and use the reputation information within reputation certificate 420. If, however, policy-compliance 112 determines that reputation certificate 420 fails to satisfy the criteria of policy file 122, then policy-compliance module 112 may instruct analysis module to not rely upon the reputation information contained within reputation certificate 420.

Returning to FIG. 9, at step 906 the systems described herein may identify, within the reputation certificate identified in step 904, reputation information associated with the executable file identified in step 902. For example, analysis module 110 may, as part of computing device 202 in FIG. 2, identify reputation information 422 in FIG. 8 within reputation certificate 420 in FIG. 4 or 5.

In some examples, the systems described herein may verify that the reputation information applies to the executable file in question prior to relying on the same. For example, analysis module 110 may, as part of computing device 202 in FIG. 2, verify that a file hash of executable code 410 within executable 402 matches the file hash contained within reputation information 422 in FIG. 8.

At step 908, the systems described herein may evaluate the trustworthiness of the executable file in question based at least in part on the reputation information contained within the reputation certificate identified in step 904. For example, analysis module 110 may, as part of computing device 202 in FIG. 2, evaluate the trustworthiness of executable 402 in FIG. 4 or 5 based at least in part on the reputation information contained within reputation certificate 420.

The systems described herein may perform step 908 in a variety of ways. For example, analysis module 110 may, upon detecting an attempt by computing device 202 in FIG. 2 to access executable 402 in FIG. 4 or 5 (as part of, e.g., security software on computing device 202), determine whether to allow computing device 202 to access executable 402 based at least in part on the reputation information contained within reputation certificate 420. In this example, since reputation information 422 in FIG. 8 indicates that executable 402 is regarded as trustworthy and/or legitimate (since, in this example, the reputation scores associated with the file in question, its publisher, and its download link all exceed 98%), analysis module 110 may allow computing device 202 to access or execute executable 402. Upon completion of step 908, exemplary method 900 in FIG. 9 may terminate.

As explained above, by including digitally signed reputation information within executable files or manifest files associated with the same, the systems and methods described herein may enable security software to access and rely upon reputation information in scenarios where network access is restricted, prohibited, and/or unavailable. In addition, because executable files within reputation systems are commonly uniquely identified by file hash, the systems and methods described herein may enable administrators and/or end users to request and obtain digitally signed reputation information for executable files at any point in time without compromising the security of the system.

Figure 10:
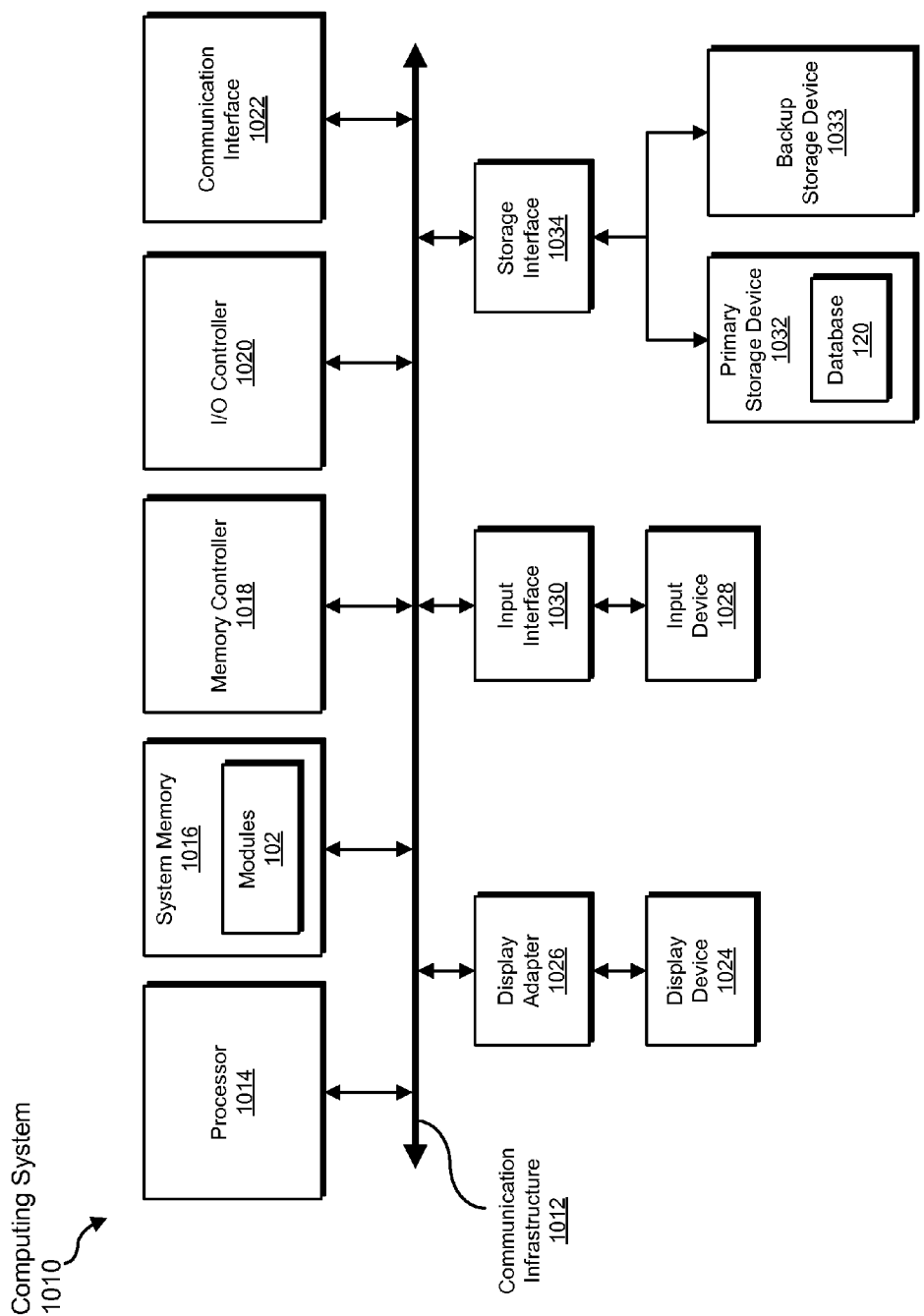
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may include at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein. For example, processor 1014 may perform and/or be a means for performing, either alone or in combination with other elements, one or more of the receiving, identifying, generating, providing, digitally signing, adding, evaluating, obtaining, validating, and determining steps described herein. Processor 1014 may also perform and/or be a means for performing any other steps, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may include both a volatile memory unit (such as, for example, system memory 1016) and a non-volatile storage device (such as, for example, primary storage device 1032, as described in detail below). In one example, one or more of modules 102 from FIG. 1 may be loaded into system memory 1016.

In certain embodiments, exemplary computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an ISA, PCI, PCIe, or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller 1018 may perform and/or be a means for performing, either alone or in combination with other elements, one or more of the steps or features described and/or illustrated herein, such as receiving, identifying, generating, providing, digitally signing, adding, evaluating, obtaining, validating, and determining.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 1030, and storage interface 1034. I/O controller 1020 may be used, for example, to perform and/or be a means for performing, either alone or in combination with other elements, one or more of the receiving, identifying, generating, providing, digitally signing, adding, evaluating, obtaining, validating, and determining steps described herein. I/O controller 1020 may also be used to perform and/or be a means for performing other steps and features set forth in the instant disclosure.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution. In certain embodiments, communication interface 1022 may perform and/or be a means for performing, either alone or in combination with other elements, one or more of the receiving, identifying, generating, providing, digitally signing, adding, evaluating, obtaining, validating, and determining steps disclosed herein. Communication interface 1022 may also be used to perform and/or be a means for performing other steps and features set forth in the instant disclosure.

As illustrated in FIG. 10, computing system 1010 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also include at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device. In at least one embodiment, input device 1028 may perform and/or be a means for performing, either alone or in combination with other elements, one or more of the receiving, identifying, generating, providing, digitally signing, adding, evaluating, obtaining, validating, and determining steps disclosed herein. Input device 1028 may also be used to perform and/or be a means for performing other steps and features set forth in the instant disclosure.

As illustrated in FIG. 10, exemplary computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a solid state drive, a floppy disk drive, a magnetic tape drive, an optical disk drive, a flash drive, or the like. Storage interface 1034 generally represents any type or form of interface or device for transferring data between storage devices 1032 and 1033 and other components of computing system 1010. In one example, database 120 from FIG. 1 may be stored in primary storage device 1032.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

In certain embodiments, storage devices 1032 and 1033 may be used, for example, to perform and/or be a means for performing, either alone or in combination with other elements, one or more of the receiving, identifying, generating, providing, digitally signing, adding, evaluating, obtaining, validating, and determining steps disclosed herein. Storage devices 1032 and 1033 may also be used to perform and/or be a means for performing other steps and features set forth in the instant disclosure.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an application specific integrated circuit (ASIC) adapted to implement one or more of the exemplary embodiments disclosed herein.

Figure 11:
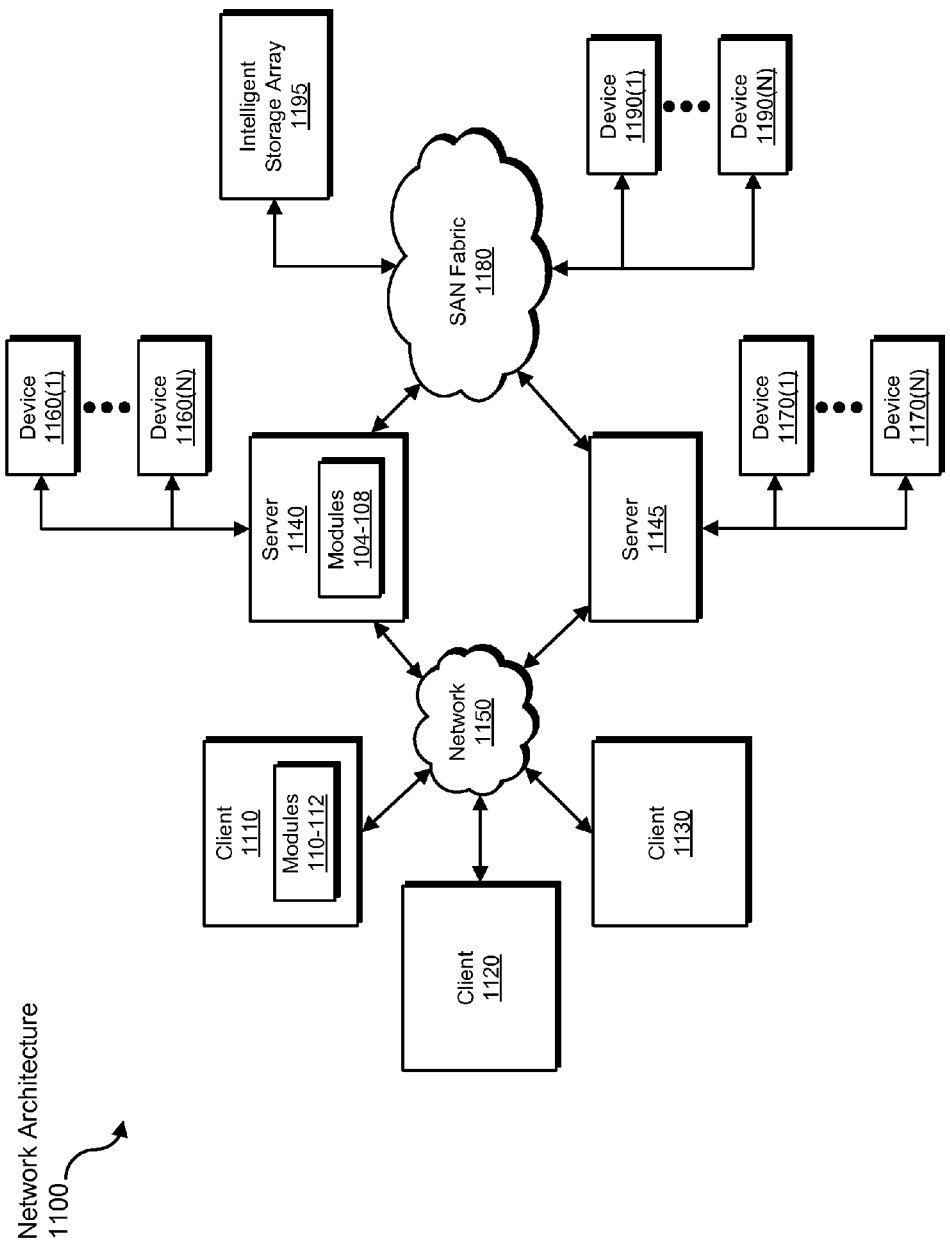
FIG. 11 is a block diagram of an exemplary computing network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. Client systems 1110, 1120, and 1130 generally represent any type or form of computing device or system, such as exemplary computing system 1010 in FIG. 10.

Similarly, servers 1140 and 1145 generally represent computing devices or systems, such as application servers or database servers, configured to provide various database services and/or run certain software applications. Network 1150 generally represents any telecommunication or computer network including, for example, an intranet, a wide area network (WAN), a local area network (LAN), a personal area network (PAN), or the Internet. In one example, client systems 1110, 1120, and/or 1130 and/or servers 1140 and/or 1145 may include portions of system 100 from FIG. 1.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent network-attached storage (NAS) devices configured to communicate with servers 1140 and 1145 using various protocols, such as NFS, SMB, or CIFS.

Servers 1140 and 1145 may also be connected to a storage area network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150. Accordingly, network architecture 1100 may perform and/or be a means for performing, either alone or in combination with other elements, one or more of the receiving, identifying, generating, providing, digitally signing, adding, evaluating, obtaining, validating, and determining steps disclosed herein. Network architecture 1100 may also be used to perform and/or be a means for performing other steps and features set forth in the instant disclosure.

As detailed above, computing system 1010 and/or one or more components of network architecture 1100 may perform and/or be a means for performing, either alone or in combination with other elements, one or more steps of an exemplary method for digitally signing executables with reputation information. In some examples, this method may include (1) receiving a request for a reputation certificate for an executable file, with the request including information that uniquely identifies the executable file, (2) identifying reputation information associated with the executable file, (3) generating a digitally signed reputation certificate for the executable file that includes at least the reputation information associated with the executable file, and then (4) providing the reputation certificate in response to the request.

In at least one example, the request may include a copy of the executable file and/or a hash of the executable file. This request may originate from a variety of sources, including a publisher of the executable file, an administrator that has encountered the executable file, and/or an end user that has encountered the executable file. In addition, the reputation information may identify a reputation of the executable file, a reputation of a publisher of the executable file, and/or a reputation of a download link associated with the executable file.

In some examples, generating the reputation certificate may include digitally signing the reputation information using a private key. Generating the reputation certificate may also include adding the reputation certificate directly to the executable file and/or adding the reputation certificate to a separate manifest file associated with the executable file.

In one example, the reputation certificate may also include information that identifies a publisher of the executable file and/or a public key provided by the publisher of the executable file. In other examples, generating the reputation certificate may include adding the reputation information to an existing certificate and then digitally signing the reputation information added to the existing certificate.

Computing system 1010 and/or one or more components of network architecture 1100 may also perform and/or be a means for performing, either alone or in combination with other elements, one or more steps of an exemplary method for evaluating the trustworthiness of executable files based at least in part on reputation information contained within digitally signed reputation certificates. In some examples, this method may include (1) identifying an executable file, (2) identifying a digitally signed reputation certificate associated with the executable file, (3) identifying, within the reputation certificate, reputation information associated with the executable file, and then (4) evaluating the trustworthiness of the executable file based at least in part on the reputation information contained within the reputation certificate.

In one example, identifying the reputation certificate may include obtaining the reputation certificate directly from the executable file and/or obtaining the reputation certificate from a separate manifest file associated with the executable file. Identifying the reputation certificate may also include validating the reputation certificate using at least one public key.

The reputation information included within the reputation certificate may identify a reputation of the executable file, a reputation of a publisher of the executable file, and/or a reputation of a download link associated with the executable file. The reputation certificate may also include information that identifies a publisher of the executable file and/or a public key provided by the publisher of the executable file.

In some examples, identifying the reputation certificate may also include (1) identifying at least one policy that includes criteria for determining whether the reputation certificate is valid and then (2) determining, by applying the criteria, that the reputation certificate is valid. Examples of the criteria included within this policy include, without limitation, criteria for determining whether the reputation certificate was created within a predetermined period of time and criteria for determining whether an online connection is available.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 from FIG. 1 may transform reputation authority subsystem 206 into a system capable of digitally signing executables with reputation information.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A non-transitory computer-readable medium comprising one or more computer-readable instructions that, when executed by at least one processor of a computing device, cause the computing device to:
   identify an executable file;
   identify a digitally signed reputation certificate associated with the executable file;
   identify, within the digitally signed reputation certificate, reputation information associated with the executable file, the reputation information including a reputation score that identifies a reputation of the executable file within a community of users, the community of users comprising a user base of a security-software publisher;
   upon identifying the digitally signed reputation certificate associated with the executable file:
   identify at least one policy that includes criteria for determining whether the digitally signed reputation certificate will supersede a reputation-database check, the criteria including at least one of criteria for determining whether the digitally signed reputation certificate was created within a specific period of time and criteria for determining whether an online connection is available;
   determine, by applying the criteria, that the digitally signed reputation certificate will supersede the reputation-database check; and
   validate the digitally signed reputation certificate using at least one public key;
   evaluate the trustworthiness of the executable file based at least in part on the reputation information contained within the digitally signed reputation certificate rather than performing the reputation-database check; and
   allow the computing device to execute the executable file based on a determination that the reputation score within the digitally signed reputation certificate satisfies a specified threshold.

2. The non-transitory computer-readable medium of claim 1, wherein the reputation information further comprises a prevalence score that identifies the prevalence of the executable file within the community of users.

3. The non-transitory computer-readable medium of claim 1, wherein identifying the digitally signed reputation certificate comprises one of:
   obtaining the digitally signed reputation certificate directly from the executable file; and
   obtaining the digitally signed reputation certificate from a separate manifest file associated with the executable file.

4. The non-transitory computer-readable medium of claim 1, wherein the reputation information further includes at least one of:
- a score that conveys the trustworthiness of a publisher of the executable file; and
- a score that conveys the trustworthiness of a download link associated with the executable file.

5. The non-transitory computer-readable medium of claim 1, wherein the criteria include criteria for determining whether the online connection is available.

6. The non-transitory computer-readable medium of claim 1, wherein the digitally signed reputation certificate further includes information that identifies a publisher of the executable file.

7. The non-transitory computer-readable medium of claim 1, wherein the digitally signed reputation certificate further includes the public key which is provided by a publisher of the executable file.

8. The non-transitory computer-readable medium of claim 1, wherein a policy file specifies the policy.

9. A computer-implemented method for evaluating the trustworthiness of executable files based at least in part on reputation information contained within digitally signed reputation certificates, the method comprising:
- identifying an executable file;
- identifying a digitally signed reputation certificate associated with the executable file;
- identifying, within the digitally signed reputation certificate, reputation information associated with the executable file, the reputation information including a reputation score that identifies a reputation of the executable file within a community of users, the community of users comprising a user base of a security-software publisher;
- upon identifying the digitally signed reputation certificate associated with the executable file:
- identifying at least one policy that includes criteria for determining whether the digitally signed reputation certificate will supersede a reputation-database check, the criteria including at least one of criteria for determining whether the digitally signed reputation certificate was created within a specific period of time and criteria for determining whether an online connection is available;
- determining, by applying the criteria, that the digitally signed reputation certificate will supersede the reputation-database check; and
- validating the digitally signed reputation certificate using at least one public key;
- evaluating the trustworthiness of the executable file based at least in part on the reputation information contained within the digitally signed reputation certificate rather than performing the reputation-database check; and
- allowing a computing device to execute the executable file based on a determination that the reputation score within the digitally signed reputation certificate satisfies a specified threshold;
- wherein the method is performed by a computing system comprising at least one hardware processor.

10. The method of claim 9, wherein identifying the digitally signed reputation certificate comprises one of:
- obtaining the digitally signed reputation certificate directly from the executable file; and
- obtaining the digitally signed reputation certificate from a separate manifest file associated with the executable file.

11. The method of claim 9, wherein the digitally signed reputation certificate further includes information that identifies a publisher of the executable file.

12. The method of claim 9, wherein a policy file specifies the policy.

13. The method of claim 9, wherein the reputation information further includes a score that conveys the trustworthiness of a publisher of the executable file.

14. The method of claim 9, wherein the reputation information further includes a score that conveys the trustworthiness of a download link associated with the executable file.

15. The method of claim 9, wherein the digitally signed reputation certificate further includes the public key which is provided by a publisher of the executable file.

16. A system comprising:
- an analysis module programmed to:
- identify an executable file;
- identify a digitally signed reputation certificate associated with the executable file; and
- identify, within the digitally signed reputation certificate, reputation information associated with the executable file, the reputation information including a reputation score that identifies a reputation of the executable file within a community of users, the community of users comprising a user base of a security-software publisher; and
- a policy-compliance module programmed to:
- identify at least one policy that includes criteria for determining whether the digitally signed reputation certificate will supersede a reputation-database check, the criteria including at least one of criteria for determining whether the digitally signed reputation certificate was created within a specific period of time and criteria for determining whether an online connection is available;
- determine, by applying the criteria, that the digitally signed reputation certificate will supersede the reputation-database check; and
- validate the digitally signed reputation certificate using at least one public key;
- wherein the analysis module is further programmed to:
- evaluate the trustworthiness of the executable file based at least in part on the reputation information contained within the digitally signed reputation certificate rather than performing the reputation-database check; and
- allow a computing device to execute the executable file based on a determination that the reputation score within the digitally signed reputation certificate satisfies a specified threshold; and
- at least one physical processor configured to execute the analysis module and the policy-compliance module.

17. The system of claim 16, wherein the analysis module identifies the digitally signed reputation certificate by performing one of:
- obtaining the digitally signed reputation certificate directly from the executable file; and
- obtaining the digitally signed reputation certificate from a separate manifest file associated with the executable file.

18. The system of claim 16, wherein the reputation information further includes a score that conveys the trustworthiness of a download link associated with the executable file.

19. The system of claim 16, wherein the reputation information further includes a score that conveys the trustworthiness of a publisher of the executable file.

20. The system of claim 16, wherein the digitally signed reputation certificate further includes information that identifies a publisher of the executable file.

* * * * *